No. 765,240. PATENTED JULY 19, 1904.
A. HOBART.
TUNE SHEET ATTACHMENT FOR AUTOPNEUMATIC PIANOS.
APPLICATION FILED MAY 21, 1904.
NO MODEL. 3 SHEETS—SHEET 3.
Fig. 5.
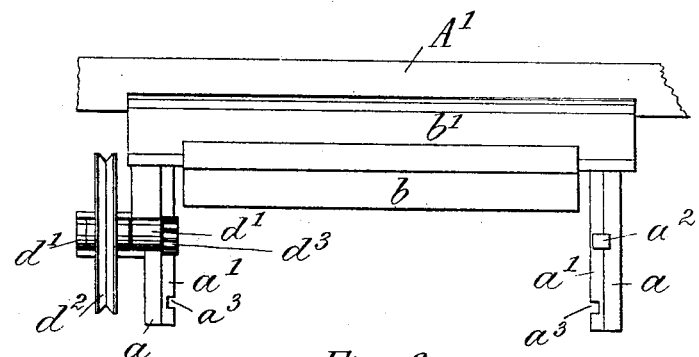
Fig. 6.
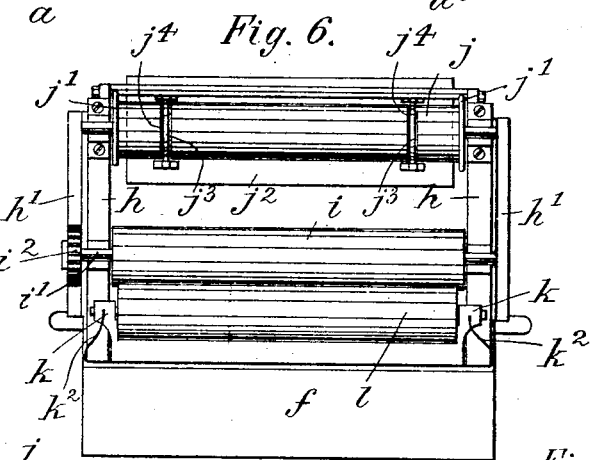
Fig. 10.
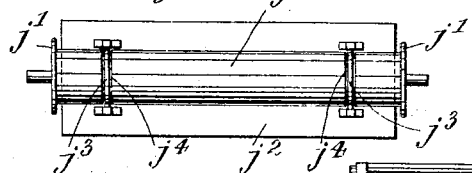
Fig. 11.
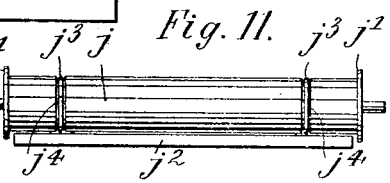
Fig. 7.
Fig. 8.
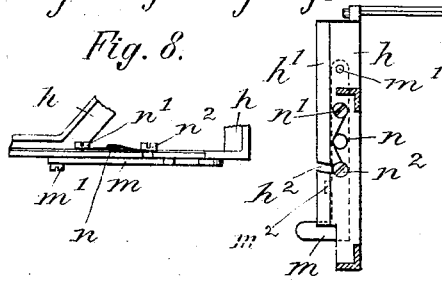
Fig. 9.
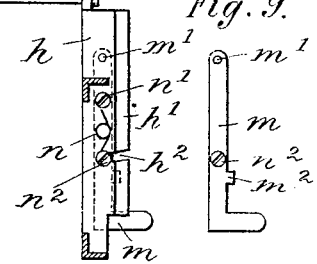
Witnesses:
Arthur Gumpe
Frederick Unfrucht
Inventor:
Adam Hobart
by Frank R. Briesen Atty.

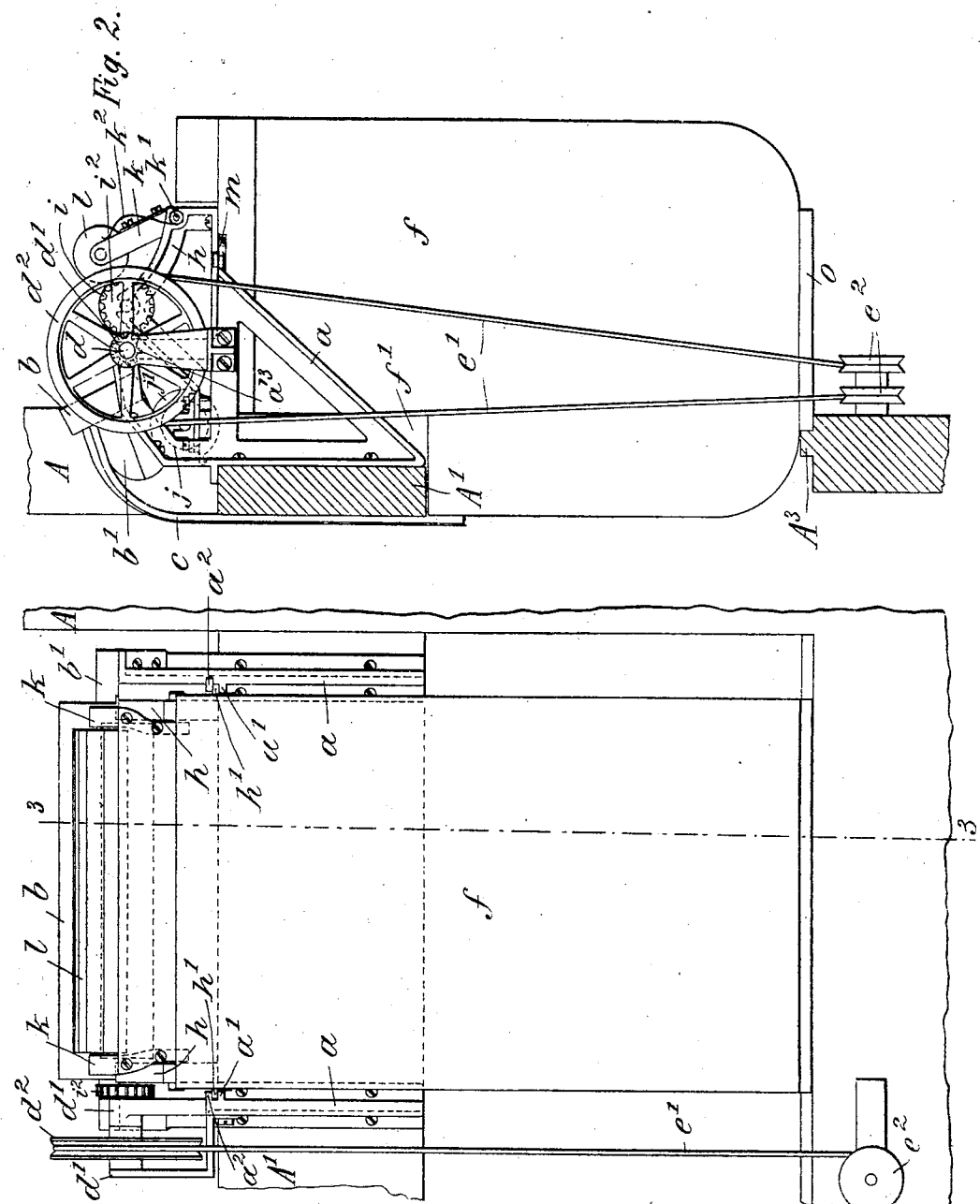

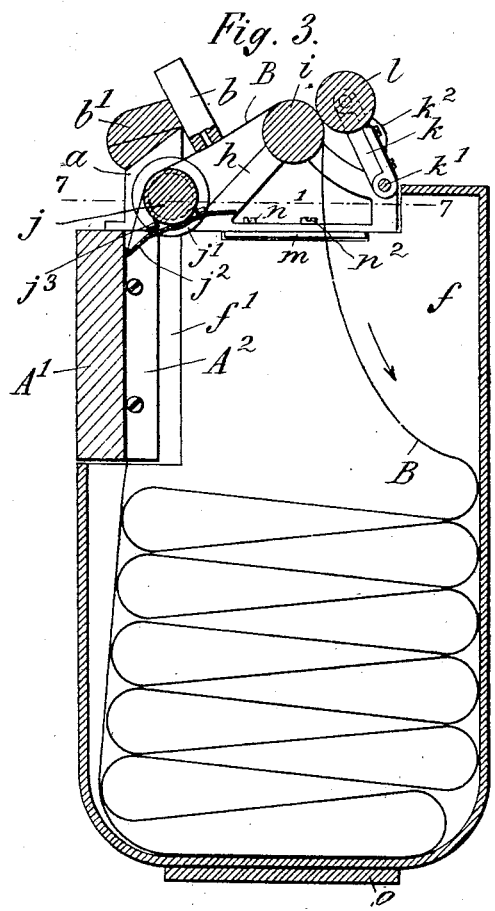
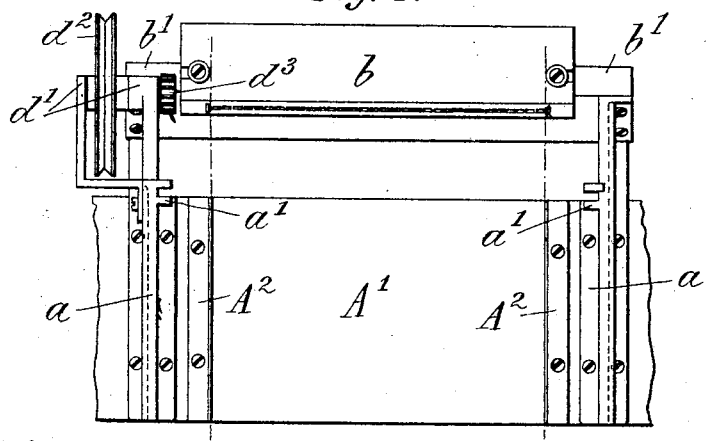

No. 765,240.

Patented July 19, 1904.

UNITED STATES PATENT OFFICE.

ADAM HOBART, OF ST. JOHNSVILLE, NEW YORK, ASSIGNOR TO ROTH AND ENGELHARDT, OF NEW YORK, N. Y., A FIRM.

TUNE-SHEET ATTACHMENT FOR AUTOPNEUMATIC PIANOS.

SPECIFICATION forming part of Letters Patent No. 765,240, dated July 19, 1904.

Application filed May 21, 1904. Serial No. 209,008. (No model.)

*To all whom it may concern:*

Be it known that I, ADAM HOBART, a citizen of the United States, residing at St. Johnsville, Montgomery county, State of New York, have invented new and useful Improvements in Tune-Sheet Attachments for Autopneumatic Pianos, of which the following is a specification.

This invention relates to a tune-sheet attachment for autopneumatic pianos or piano-players, which is separable from the piano-case and permits different tune-sheets to be readily inserted. When the attachment is secured to the case, a true engagement between the tune-sheet and the duct-bridge or tracker-bar will be at once established, while the tune-sheet feed-roller will be simultaneously intergeared with the driving-shaft.

In the accompanying drawings, Figure 1 is a front view of my improved tune-sheet attachment; Fig. 2, a side view thereof; Fig. 3, a vertical section on line 3 3, Fig. 1; Fig. 4, an elevation of part of the back of a piano-case adapted to support the attachment; Fig. 5, a plan of Fig. 4; Fig. 6, a plan of the attachment; Fig. 7, a horizontal section through the attachment on line 7 7, Fig. 3; Fig. 8, a side view of Fig. 7, partly broken away; Fig. 9, a detail of the catch; Fig. 10, a plan of the guide-roller and tension-plate, and Fig. 11 a front view thereof.

Briefly stated, my invention consists in providing an autopneumatic piano or piano-player with a receptacle or box which is separable from the piano-case and contains the tune-sheet and tune-sheet rollers. The duct-bridge and the driving-shaft for the tune-sheet are attached to the piano-case proper, and when the box is connected to the latter a proper engagement between the duct-bridge and tune-sheet, as well as between the driving-shaft and tune-sheet feed-roller, at once takes place.

A represents the case of an autopneumatic piano or piano-player, provided at its back with a horizontal rail $A'$, having tune-sheet guides or flanges $A^2$. From rail $A'$ project a pair of brackets $a$, having rails $a'$. Upon brackets $a$ is supported the cross-bar $b'$ of the duct-bridge $b$, Fig. 4, which communicates with the usual pneumatic tubes $c$. The duct-bridge is arranged intermediate the brackets $a$ and obliquely to case A, so as to project a distance back of the same, with its working end turned downward, Figs. 3 and 4. One of the brackets $a$ carries the bearings $d'$ $d'$ of a driving-shaft $d$, upon which are mounted the driving-pulley $d^2$ and a transmission gear-wheel $d^3$. The pulley $d^2$ receives motion from a suitable motor $e$ by rope $e'$, passing over idler $e^2$.

$f$ is the separable receptacle or box that contains the endless tune-sheet B and is adapted to be removably attached to the case A in manner hereinafter described. The box $f$ is of a width to fit between the brackets $a$ and is recessed at $f'$ to accommodate rail $A'$. At each side of its open top the box $f$ is provided with a frame $h$. In frames $h$ turn the journals of two tune-sheet rollers $i$ $j$, of which the roller $i$ is placed above and in front of roller $j$. In this way the tune-sheet B assumes a dip intermediate the rollers that corresponds to the angle of duct-bridge $b$, Fig. 3. The roller $i$ constitutes the feed-roller, for which purpose one of its journals $i'$ carries a gear-wheel $i^2$, which intergears with wheel $d^3$ of shaft $d$ when the box $f$ is connected to case A. To frames $h$ are also pivoted at $k'$ a pair of arms $k$, influenced by springs $k^2$ and carrying a pressure-roller $l$, which holds sheet B frictionally against roller $i$. The roller $j$ constitutes a guide-roller and is provided at its ends with flanges or heads $j'$, that prevent the sheet B from swerving. From roller $j$ is loosely suspended a tension-plate $j^2$ by means of straps $j^3$, which engage circumferential grooves $j^4$ of roller $j$. The rear edge of plate $j^2$ is by gravity held against sheet B and presses the latter against rail $A'$, so as to hold the sheet under proper tension. From frames $h$ extend laterally flanges $h'$, which slidably engage the rails $a'$ of brackets $a$. To prevent tilting of box $f$, one or more lugs $a^2$ are formed on brackets $a$ above flanges $h'$. To the lower side of each frame $h$ is fulcrumed at $m'$ a catch $m$, forced outward by a spring $n$. This spring is attached by a screw $n'$ to the upper side of frame $h$ and by a pin $n^2$ to catch m. For the accommodation of this pin the frame h is slotted, as at $h^2$. The catches m are provided with projections $m^2$, which are adapted to enter corresponding recesses $a^3$ of rails $a'$ and to thus lock the box to the brackets. The bottom of box $f$ may be provided with a plate $o$, which bears against a corresponding abutment $A^3$ of case A, Fig. 2.

In use the tune-sheet B, perforated, preferably, to play consecutively several pieces of music, is fitted into the detached box $f$, and then the latter is secured to case A by sliding the flanges $h'$ along the rails $a'$ as far back as possible, when the projections $m^2$ of catches m will enter the recesses $a^3$ of rails $a'$ and lock the box to the case A. When the box is thus attached to the case, the perforations of sheet B will register positively with the openings of the duct-bridge, so that any lateral adjustment of the sheet is obviated. At the same time the wheel $i^2$ will become intergeared with wheel $d^3$, so that the motor $e$ will rotate feed-roller $i$. If it is desired to change the tune-sheet, the box $f$ is again detached by manipulating the catches m and drawing the box off the brackets.

What I claim is—

1. An autopneumatic piano-case having a duct-bridge, combined with a box having a tune-sheet and tune-sheet rollers, and means for detachably securing said box to said case, substantially as specified.

2. An autopneumatic piano-case having a duct-bridge and a driving-shaft, combined with a box having a tune-sheet and a feed-roller, means for detachably securing the box to said case, and means for intergearing the feed-roller with the driving-shaft, substantially as specified.

3. An autopneumatic piano-case having a pair of brackets and an intermediate duct-bridge, combined with a detachable box slidable upon the brackets and having a tune-sheet and tune-sheet rollers, substantially as specified.

4. An autopneumatic piano-case having a pair of brackets and an intermediate duct-bridge, combined with a detachable box slidable upon the brackets and having a tune-sheet and tune-sheet rollers, and with a catch for locking the box to the brackets, substantially as specified.

5. An autopneumatic piano-case having a pair of brackets, an intermediate duct-bridge and a tune-sheet guide, combined with a detachable box slidable upon the brackets and having a tune-sheet and tune-sheet rollers, substantially as specified.

6. The combination of an autopneumatic piano-case with a duct-bridge, a driving-shaft and a pair of brackets having rails, and with a detachable box having flanges engaging said rails, tune-sheet rollers journaled in the box, and means for locking the box to the case, substantially as specified.

7. An autopneumatic piano-case provided with a detachable box, a guide-roller journaled therein, and a tension-plate suspended from said roller, substantially as specified.

8. An autopneumatic piano-case provided with a detachable box, a grooved guide-roller journaled therein, a tension-plate, and straps secured to the plate and engaging the roller-grooves, substantially as specified.

Signed by me at St. Johnsville, Montgomery county, New York, this 9th day of May, 1904.

ADAM HOBART.

Witnesses:
 HENRY H. CARROLL,
 WALTER L. ENGELHARDT.